Patented Apr. 10, 1923.

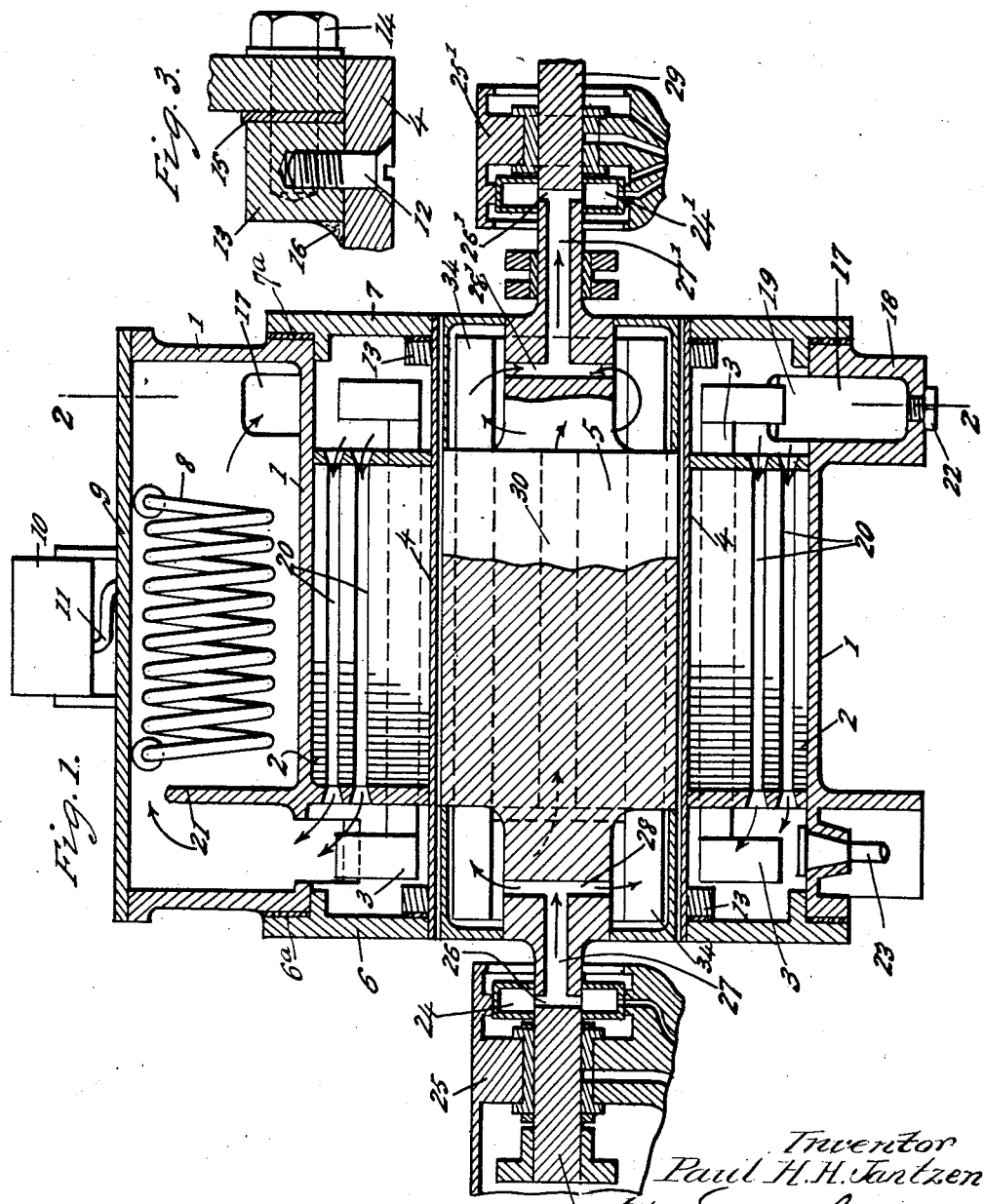

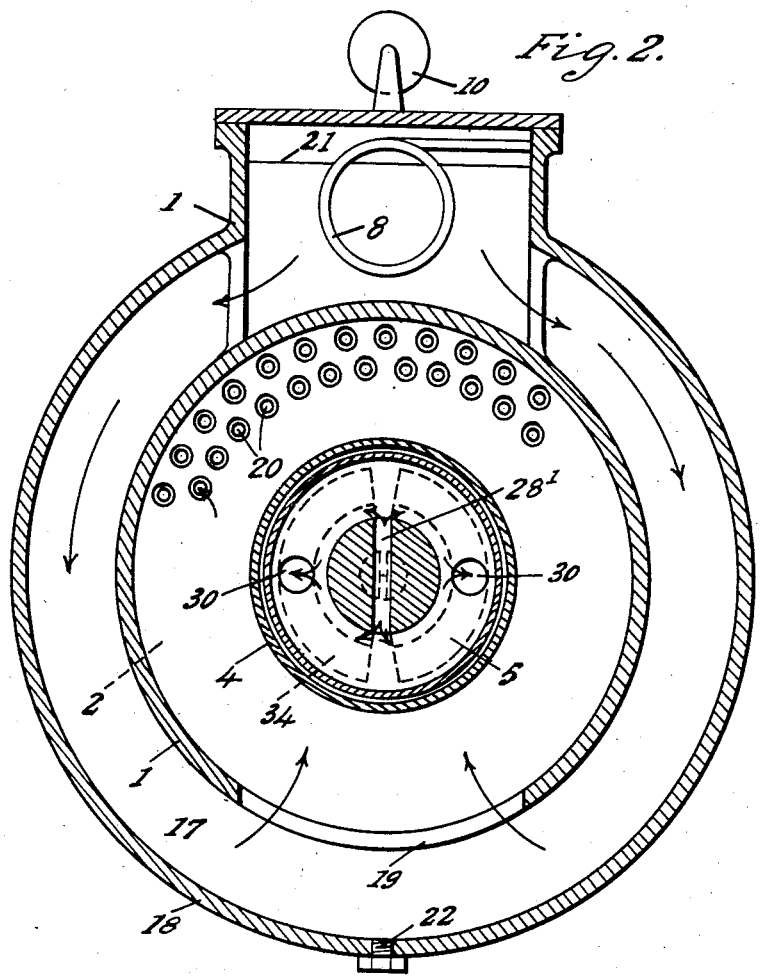

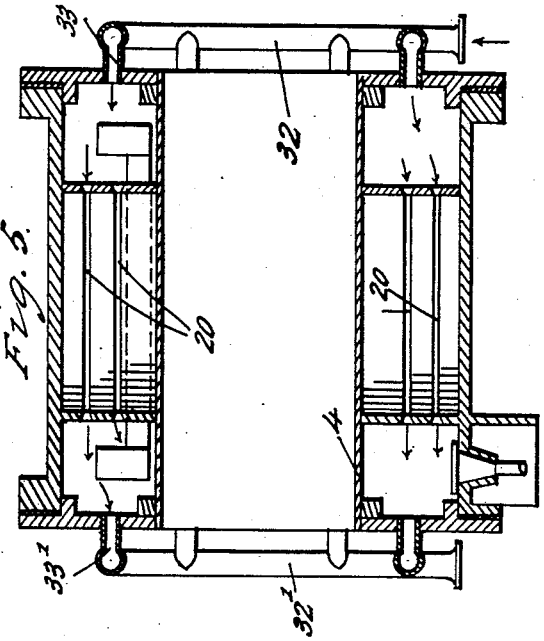
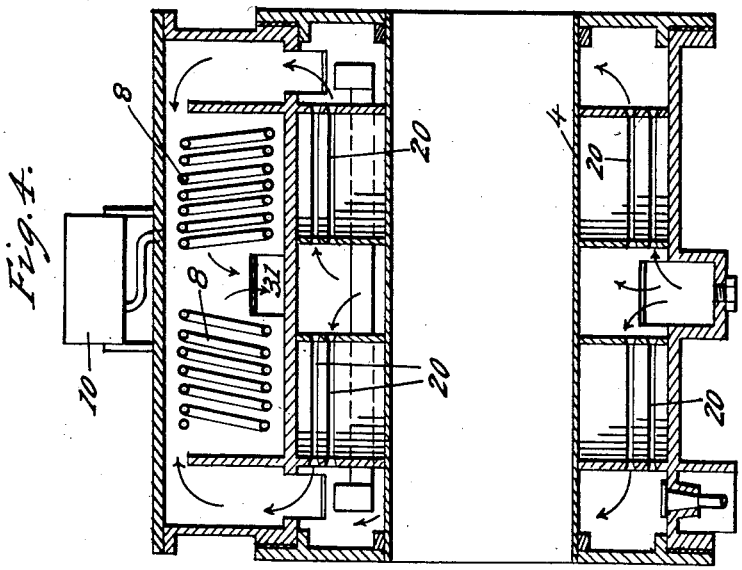

1,451,577

UNITED STATES PATENT OFFICE.

PAUL HERMANN HUDDEN JANTZEN, OF LONDON, ENGLAND.

DYNAMO-ELECTRIC MACHINE.

Application filed April 10, 1920. Serial No. 372,758.

*To all whom it may concern:*

Be it known that I, PAUL HERMANN HUDDEN JANTZEN, a subject of the King of Great Britain, residing in London, England, have invented certain new and useful Improvements Relating to Dynamo-Electric Machines, of which the following is a specification.

The invention relates to means for cooling the stators and rotors of dynamo electric machines and is of the known type in which the stator is separated from the rotor by a non-magnetic material so that these parts can be independently cooled by suitable means. Machines are also known in which the rotor is cooled by fluid admitted and removed by channels provided at each end of the shaft.

According to the invention the stator and rotor are separated by a partition of non-magnetic and high resistance material, the stator end windings are immersed in and cooled by oil and the rotor by an independent circulation of insulating fluid, the cooling medium circulating in both rotor and stator through axially disposed passages in the cores.

The oil is caused to circulate in the stator by convection or by mechanical means and is cooled by passage through coils external to the machine or by water-cooled coils situated in the upper part of the machine.

In the accompanying drawings which represent examples of cooling arrangements according to the invention, Fig. 1 is a sectional elevation of the rotor and stator of a dynamo electric machine in which the oil in the stator compartment is cooled by a circulation of water; Fig. 2 is a section on line 2—2 of Fig. 1; Fig. 3 shows on a larger scale a detail of construction; Fig. 4 is a sectional elevation of a stator in which the path of the circulating oil is slightly modified; Fig. 5 is a similar view of a stator in which the oil is cooled by external means.

Referring to the construction shown in Figs. 1—3, 1 is a casing containing the stator core 2 and windings 3, a liner or partition 4 of suitable non-magnetic material separating the stator compartment from the rotor 5. This liner is preferably made of an alloy having a low electric conductivity, or of an insulating material of suitable strength. Cover plates 6 and 7 enclose the ends of the stator compartment. The casing 1 is extended at the upper portion to enclose a coil 8 through which water circulates to cool the oil in the stator compartment and a cover 9 closes this extension. Expansion of the oil is allowed for by a container 10 in communication by a pipe 11 with the oil in the casing. As shown in Fig. 3, an oil-tight joint is obtained between the liner 4 and the end covers 6 and 7 by countersunk screws 12 threaded into a steel ring 13 which fits tightly over the liner 4; bolts 14 secure the ring 13 to the plate 7; an oil-proof washer 15 being interposed between the ring and cover, an oil-proof cement composition 16 being applied to the junction of the inner end of the ring 13 with the liner 4 after these parts have been secured together by the screws 12. Oil-proof washers $6^a$ and $7^a$ are also inserted between end shields 6 and 7 and casing 1.

A tubular passage 17 is provided at one end of the casing 1 by means of a concentric wall 18, so arranged that the oil circulates, as shown by the arrows, from the upper extension of the casing, where it is cooled by the coils 8, through the passage 17 on either side of the casing 1, through an aperture 19 in the casing, whence it flows through channels 20 provided in the stator core to the other end of the stator and ascends again past a baffle plate 21 to the upper extension of the casing and flows past the cooling coils 8. The removal of a screw plug 22 enables the oil to be drawn off at any time. Terminals 23 connect the windings 3 with the external circuit.

For the purpose of cooling the rotor 5 oil is pumped into a chamber 24 provided in the bearing 25, flows thence through passages 26, 27, 28 in the shaft 29 and, as shown by the arrows, through channels 30 in the rotor core and then through passages 28', 27' and 26' at the other end of the shaft 29 leading to a chamber 24' in the bearing 25', the oil being cooled by suitable means provided externally to the rotor. The oil is brought into intimate contact with the windings 34 as well as with the core.

As a lower voltage is usually impressed on the rotor windings than on the stator windings, lubricating oil may be used as the medium for cooling the rotor, any forced oil circulation plant being used for this purpose or in certain cases air may form the cooling medium.

In the modification shown in Fig. 4, the oil after being cooled by contact with the water pipes flows, as shown by the arrows, down the channel 31 provided at the centre of the stator compartment, and then divides and passes through the channels 20 to each end of the stator core and ascends again to the upper part of the casing.

In the modification shown in Fig. 5, the oil is pumped into a pipe 32, whence it passes through openings 33 into the interior of the stator and after traversing the stator core escapes by similar openings 33' to a pipe 32', and is cooled externally.

Having thus described the nature of the said invention and the best means I know of carrying the same into practical effect, I claim: —

1. A stator structure of a dynamo electric machine comprising a core having passages therethrough, windings carried by said core, a frame supporting said core, end members and an internal cylindrical member forming with said frame and enclosure for the core, the windings, the regions adjacent the ends of the core and the end parts of the windings, the said internal cylindrical member being of non-magnetic and high-resistance material, means for producing circulation of oil through the enclosed space, and means for cooling the oil in circulation.

2. A stator structure of a dynamo electric machine comprising a core and windings carried thereby, the said core having passages extending through it axially, a frame supporting said core, end members and an internal cylindrical member forming with said frame an enclosure for the core, the windings, the regions adjacent the ends of the core, and the end parts of the windings, the said internal cylindrical member being of non-magnetic and high-resistance material, means for producing circulation of oil through the enclosed space and through the axial passages in the core and means for cooling the oil in circulation.

3. A stator structure of a dynamo electric machine comprising a core having passages therethrough and windings carried thereby, a frame supporting said core, end members, an internal cylindrical member of non-magnetic and high-resistance material, said frame, end members and internal member enclosing the core, the windings, the regions adjacent the ends of the core, and the end parts of the windings, and a chamber above the core, cooling means in said chamber, the said chamber being in communication with said end regions to permit circulation of oil between the chamber and the end regions and through the passages in the core.

4. A stator structure of a dynamo electric machine comprising a core and windings carried thereby, said core having axial passages, a frame supporting said core, end members, an internal cylindrical member of non-magnetic and high-resistance material, said frame, end members and internal member forming an enclosure for the core windings, the regions adjacent the ends of the core, and the end parts of the windings, a chamber above the core, cooling means in said chamber, and separate passages connecting said chamber with the said end regions for permitting flow of oil from the chamber into one of the end regions and through the axial passages in the core to the other end region and thence to the chamber.

In testimony whereof I have signed my name to this specification.

PAUL HERMANN HUDDEN JANTZEN.